United States Patent
Eswara et al.

(10) Patent No.: US 6,597,927 B1
(45) Date of Patent: Jul. 22, 2003

(54) NARROW BEAM TRAFFIC CHANNEL ASSIGNMENT METHOD AND APPARATUS

(75) Inventors: Srinivas Eswara, Carrollton, TX (US); Keith S. Wilson, Hertfordshire (GB); Michael J. McCarthy, University Park, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/321,517

(22) Filed: May 27, 1999

(51) Int. Cl.[7] .............................. H04Q 7/20; H04B 1/38
(52) U.S. Cl. .................... 455/562; 455/450; 455/434; 455/437; 455/440; 455/443; 455/456; 370/334
(58) Field of Search ............................ 455/562, 561, 455/440, 450, 452, 443, 434, 437, 438, 456, 509, 513, 515; 370/334, 331

(56) References Cited

U.S. PATENT DOCUMENTS

| | | | |
|---|---|---|---|
| 4,144,412 A | * 3/1979 | Ito et al. .................. 455/450 |
| 4,144,496 A | * 3/1979 | Cunningham et al. ...... 455/452 |
| 4,723,266 A | * 2/1988 | Perry ........................ 455/446 |
| 5,357,559 A | * 10/1994 | Kallin et al. ................ 455/434 |
| 5,535,423 A | * 7/1996 | Dupuy ....................... 455/513 |
| 5,546,443 A | * 8/1996 | Raith ......................... 455/450 |
| 5,548,807 A | * 8/1996 | Ueda ......................... 455/509 |
| 5,596,333 A | * 1/1997 | Bruckert .................. 455/277.1 |
| 5,615,409 A | * 3/1997 | Forssén et al. ............. 455/440 |
| 6,011,787 A | * 1/2000 | Nakano et al. ............. 455/422 |
| 6,141,566 A | * 10/2000 | Gerdisch et al. ........... 455/562 |
| 6,161,024 A | * 12/2000 | Komara ..................... 455/562 |
| 6,167,286 A | * 12/2000 | Ward et al. ................. 455/562 |
| 6,240,290 B1 | * 5/2001 | Willingham et al. ........ 455/440 |
| 6,301,238 B1 | * 10/2001 | Hagerman et al. ......... 455/562 |

FOREIGN PATENT DOCUMENTS

| | | | |
|---|---|---|---|
| DE | 197 47 365 | 4/1999 | ........... H04Q/7/38 |
| EP | 0 797 369 | 9/1997 | ........... H04Q/7/36 |
| WO | 96/09733 | 3/1996 | ........... H04Q/7/30 |

* cited by examiner

*Primary Examiner*—William Trost
*Assistant Examiner*—Rafael Perez-Gutierrez
(74) *Attorney, Agent, or Firm*—Carr LLP

(57) ABSTRACT

Disclosed is an apparatus for reducing the number of control signal channels required in a wireless communication system by using a umbrella control signal to initially communicate with an MS (mobile station) within the umbrella and to assign the MS to a traffic frequency corresponding to one of a plurality of antenna used to cover the area covered by said umbrella control signal. Logic is used in combination with measured relative signal strengths to determine the position of the MS relative to the reliable reception coverage area of each of the plurality of antennas before the assignment is made.

10 Claims, 3 Drawing Sheets

| BEAM | P1 MAIN | P2 (LEFT) | P3 (REAR) | P4 DIVERSITY | P5 (RIGHT) | P6 (REAR) |
|---|---|---|---|---|---|---|
| A | A(M) | Z(D) | Y | A(D) | B | Z |
| B | B(M) | A | Y | B(D) | C | Z |
| C | C(M) | B | Y | C(D) | D | Z |
| D | D(M) | C | Y | D(D) | Y(D) | Z |
| X | X(M) | A | B | X(D) | C | D |

NARROW BEAM TRAFFIC CHANNEL ASSIGNMENT METHOD AND APPARATUS

TECHNICAL FIELD

The present invention relates in general to wireless cellular systems and in particular to methods and systems for assigning the most appropriate traffic channel frequency, in systems using multiple beams to cover a given cell or sector of a cell, to a MS (mobile station) that may be located within the field of coverage of any of said multiple beams.

BACKGROUND

As cellular system technology becomes more popular, more and more customers need to use the systems simultaneously. One solution was to make cell sizes smaller to thus increase the number of cells thereby increasing the number of customers that may use MSs (mobile stations) simultaneously. Another solution was to use TDM (time division multiplex) to permit communication with more than one customer per channel of allotted frequency. A further potential solution has been to divide a cell into different sectors and where each sector in essence may operate in a manner similar to creating a smaller cell for the area covered by a sector. It is presently quite common for each cell to be divided into three sectors in urban areas. In such situations, a separate control channel frequency is used for each sector.

Since a system is only allowed a given number of frequency channels, each control channel required for system operation lessens the number of channels available for general traffic.

It has been proposed that a sector may be further subdivided using narrow beam antennas with a separate control channel for each sub-sector. The narrow beams help limit the amount of RF interference in the system and thus increase total system capacity for a given number of traffic channels available. While there should not be any technical reason why such a system would not operate, the large number of control channels required makes such a configuration impractical.

The control channels are used for communications between the mobile unit and the antenna/base station or BTS (base transceiver station). As set forth in an industry standard designated as IS-136, this function is provided by the digital control channel (DCCH). The DCCH is a continuous data stream that provides the system identity and configuration information needed by all users. It also provides paging information that alerts mobile units about the presence of incoming calls. The control channels are defined in terms of reverse and forward control channels. The forward control channel (FCCH), also known as forward DCCH, provides information from the cell site base station to the user. This is known as "downlink" information.

The reverse control channel (RCCH), also known as reverse DCCH, provides information from the mobile unit to the cell site, known as "uplink" information. The RCCH is mainly used for access requests such as call initiations, page responses, and registration of information as the mobile unit crosses cell boundaries.

One of the functions provided by the DCCH is to relay information related to Mobile Assisted Channel Allocations (MACA). At the present time, the forward MACA message, known as the MACA List, provides each mobile unit with a list of traffic channels which it can use in a particular cell when it is within the boundaries of that cell. When a mobile unit enters a cell's boundaries, it receives an overhead message from the base station with a request to forward its MACA report with any of 4 specified mobile generated messages (origination, page response, registration, and audit response). The MACA report provides the signal strength measurement for the traffic channels in the received MACA list. This information is presently utilized in determining which channel will become the traffic communications channel for the mobile unit.

When a mobile unit, in a TDMA (time division multiplex access) cellular system, begins transmitting on a traffic channel, the base station sends a list of adjacent DCCHs, known as the MAHO List, followed by a start measurement order on the forward FACCH (fast associated control channel). Once every second, the mobile unit responds with CQMs (Channel Quality Messages) on the reverse SACCH (slow associated control channel) which provide the signal strength measurement for each DCCH in the requested MAHO List. The base station presently uses this CQM data to determine when the mobile unit should be transferred (handed-off) to another cell.

Older wireless systems, operating under a prior standard designated as IS-54 use an analog control channel referred to as ACCH. Such systems do not include MACA capabilities.

Systems presently operating under either the IS-54 or IS-136 use at least one control channel per antenna beam generated for assigning traffic channels to MSs operating within the cellular coverage area of a BTS.

SUMMARY OF THE INVENTION

These and other disadvantages are overcome by the present invention. In one aspect of the invention, method and apparatus are provided for assigning MSs roaming throughout the area covered by multiple beams, the appropriate traffic frequency while reducing the number of control channels required to cover the multiple beam area to less than one control channel per antenna beam.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
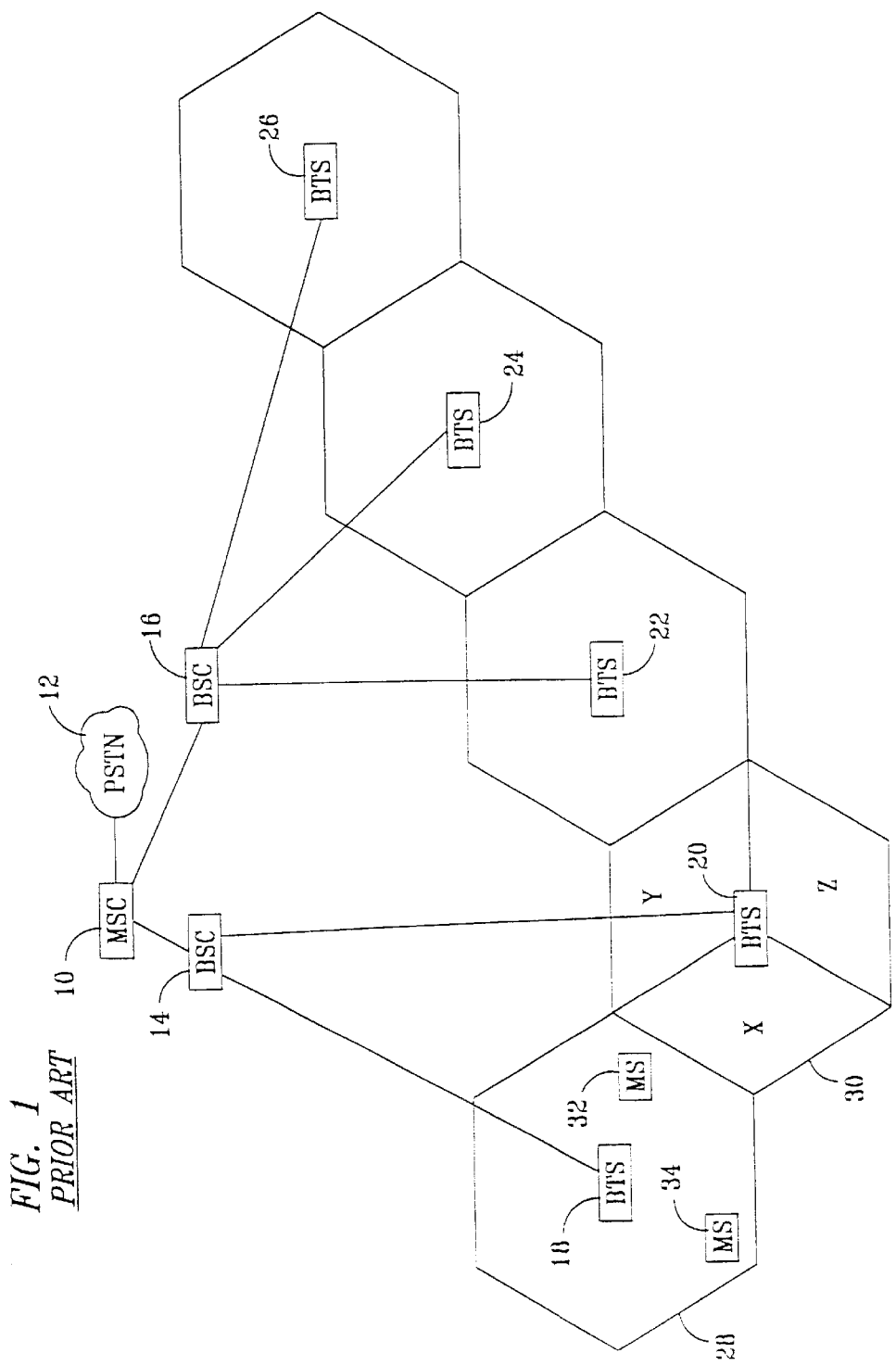
FIG. 1 is a block diagram of a wireless prior art system.

In FIG. 1, a mobile switching center (MSC) 10 is shown connected to a cloud 12 representing the public switched telephone network (PSTN) as well as being connected to a pair of base station controllers (BSC) 14 and 16. BSC 14 is connected to a pair of base transceiver stations (BTS) 18 and 20. BSC 16 is shown connected to a plurality of BTSs 22, 24, and 26. Surrounding each BTS there is a hexagon representing a cell or the area of radio coverage area of one or more antennas associated with the BTS. The hexagon cell around BTS 18 is labeled 28. Within cell 28 are shown two mobile stations (MSs) 32 and 33. As traffic in a cell increases, the cell traffic capacity may be increased by dividing the cell into sectors through the use of additional antennas. A common practice is to use 3 antennas to cover an area such as a cell labeled 30 surrounding BTS 20. The three sectors within cell 30 are labeled X, Y, and Z.

Figure 2:
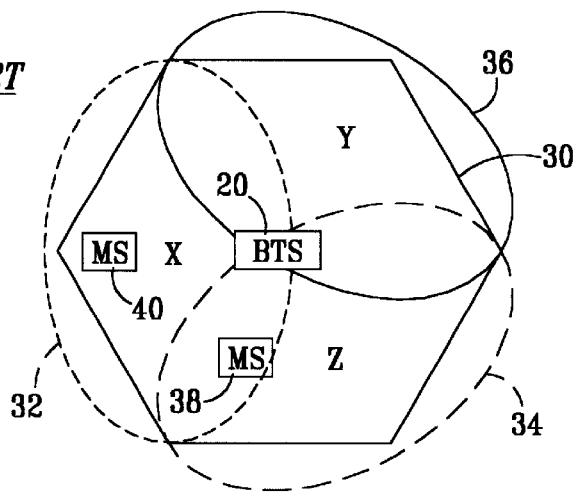
FIG. 2 illustrates the beam coverage area in a prior art sectored cell for 3 antennas.

FIG. 2 illustrates in more detail cell 30 of FIG. 1. A short dash line 32 is representative of the actual area covered by radio waves transmitted by an antenna for sector X which may be reliably received by an MS. A long dash line 34 encloses the sector Z and represents the sector coverage area of a second antenna. As may be noted there is an area of overlap of antenna coverage at the boundary of a sector. A solid line 36 represents the reliable coverage area of an antenna for sector Y. Thus the coverage of sector or line 36 overlaps both sectors 32 and 34. An MS 38 is shown in the overlap region of sectors 32 and 34 (X and Z). When MS 38 is transmitting, the antenna for both of these sectors are likely to receive the signal at substantially the same signal strength. The antenna for sector Y may also receive signals transmitted by MS 38. However, since these signals are received from the back side of the antenna, the signal strength will be greatly diminished. A further MS 40 is shown substantially centered within sector X. When MS 40 transmits, the antenna for sector X will receive the strongest signal and both of the antennas for sectors Y, and Z will receive reduced amplitude but substantially equal strength signals. Logic circuitry may thus be used within BTS 20 to determine which antenna should be used to communicate with an MS based upon relative signal strength. The same logic may be used when an MS is in an overlap zone, as is MS 38, so that the MS may be handed off from one antenna to another in the same cell.

Figure 3:
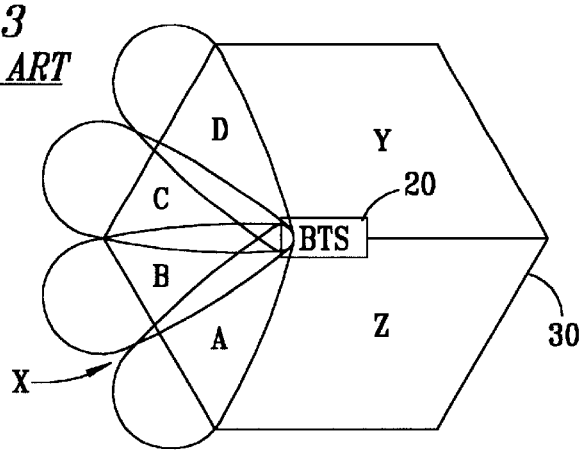
FIG. 3 illustrates the beam coverage in a proposed prior art four antenna narrow beam coverage of a 120 degree cell sector.

It has been proposed that a sector of a cell be further divided using additional narrow beam antennas to further increase cell capacity. Such a cell is illustrated in FIG. 3. Cell X shows 3 overlapping beams A, B, C, and D each generated by separate antennas. Each of these beams would have an assigned set of traffic frequencies for use by MSs and a control frequency for assigning traffic frequencies, channel of an assigned frequency, handover channels, and so forth. As mentioned above, this approach to solving cell capacity problems has not been actively pursued because the large number of frequencies used for control severely limits the number of frequencies available for traffic signals.

Figure 4:
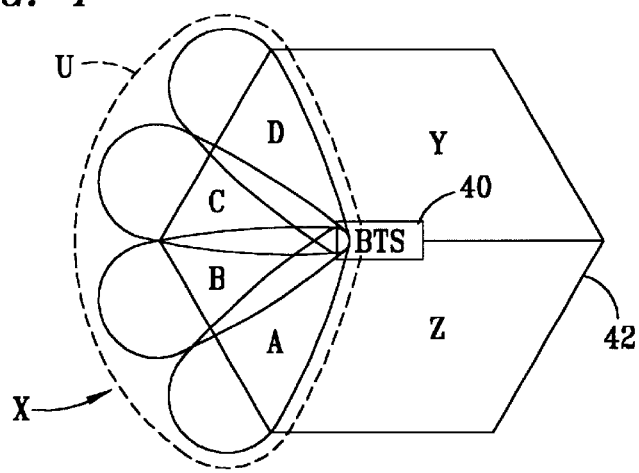
FIG. 4 illustrates the beam coverage in the present invention using an umbrella beam control signal antenna in combination with four narrow traffic beam antennas to provide coverage of a 120 degree cell sector.

FIG. 4 is similar to FIG. 3 but is distinguished by labeling a BTS as 40 and the cell generated by BTS 40 as cell 42. BTS 40 uses 5 antennas (not shown) for sector X. Traffic signal beams A, B, C, and D operate to cover the entire sector with 4 of the antennas. The fifth antenna is used to provide a control channel beam covering the entire sector and is labeled in the drawing as beam U. Beam U may be categorized as an umbrella beam in that it covers the same total area as the 4 antennas generating traffic beams covering the sector X. Sectors Y, and Z may operate in conventional fashion wherein each has a single antenna for both control and traffic signals. On the other hand, one or both of sectors Y, and Z may have multiple antennas with one antenna operating to provide an umbrella control beam for that sector and the remaining antennas providing narrow traffic beam radio signal coverage. Each of the sectors may have a different number of narrow traffic beams if so desired. As will be apparent from the description of operations, only three control frequencies are required to control the operation of MSs operating within a 3 sectored cell shown even though there are many more than 3 narrow beam antennas providing traffic signals. It should also be noted that, in accordance with prior designs, a single structure may be used as antenna means to generate a plurality of beams wherein each beam is a different frequency and covers a different area. Thus the term "a plurality of antennas" may include a single structure for generating multiple beams covering different areas. Also, to increase reliability of transmission and reception, at least one diversity path antenna may be utilized, in addition to a main path antenna, for each signal being transmitted to and received from an MS by a BTS. Further, it should be noted that an area such as B is intended to show illustratively an area of reliable reception of signal. Depending upon various physical and electrical conditions in the environment, the area covered by radio waves from an antenna structure that can be detected by an MS is likely to be much greater than that shown. Finally, it should be noted that a directional or beam forming antenna can not only transmit and receive signals in the forward direction, but can do transmit and receive signals from the back side although at a much lower signal strength or sensitivity.

Figures 5, 6:
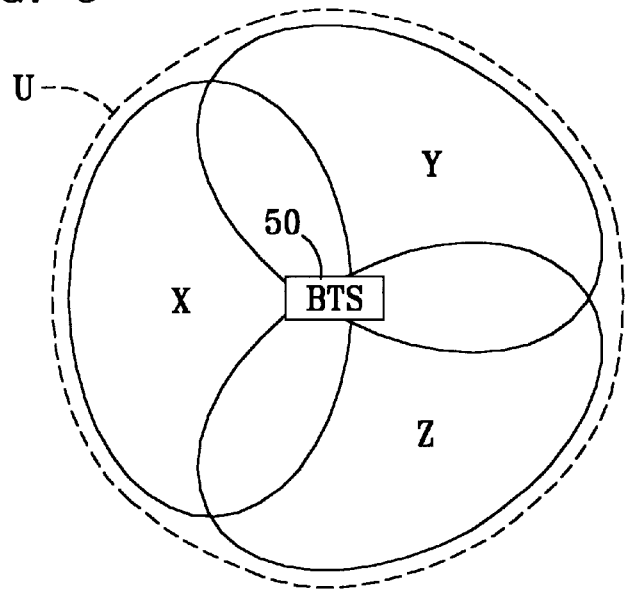
FIG. 5 illustrates an umbrella control signal and multiple traffic signal antenna configuration for an entire cell.
FIG. 6 comprises a chart used in explaining the assignment of traffic frequency antennas to an MS in an IS-54 system embodiment of the invention.

FIG. 5 illustrates the invention using a single umbrella beam U for an entire cell generated by a control beam antenna of a BTS 50 where the single control signal is used to control all MSs actions communicating with BTS 50 via traffic signals generated over each of the sector beam antennas for sectors X, Y, and Z. A sector beam such as X in FIG. 5 may be considered a narrow beam as compared to the umbrella beam U.

When practicing the present invention in conjunction with an IS-136 compliant system, each narrow beam antenna transmits one traffic or voice frequency of those frequencies assigned by the system to that antenna at a constant power level. These constant power level signals may be termed "beacon" signals. The umbrella antenna broadcasts on the DCCH to all MSs in the coverage area, a list of those beacon frequencies which are included in the MACA list. Upon origination or in response to a page on this DCCH, each MS supplies information relative to the downlink signal strengths of all the listed MACA frequencies (the beacon frequencies). This use of this information is slightly different from that in prior art systems which used the information solely to determine the best frequency traffic channel to use with a given antenna. The present invention uses the information to determine the antenna that is forming the specific narrow beam within which the MS is located since the signal strength of that beam should be the greatest and the adjacent traffic beams should provide the second highest detected signal strengths.

From the information provided to the BTS 40, a determination may readily be made that an MS is, for example, in beam B between the edges of the overlapping portions of beams A and C if the MS reports that the downlink signal strength of beacon B as seen by the MS is substantially stronger than beacons A and C. If on the other hand, the report is that beacon signals A and B are substantially the same strength, it may logically be assumed that the MS is located in a area on the edge of beacon B where beacon A overlaps. In either event, it is likely that the system would instruct the MS to use one of the frequencies that is assigned to the portion of the system using antenna B. On the other hand, if all the channels available for antenna B are being used, and it is further determined that an MS is closer to the area of coverage of antenna A than it is to antenna C, the MS may well be instructed to use a frequency available to antenna A. An alternative assignment of channels, when a given antenna is already overloaded, is to temporarily use one of the traffic channels of the umbrella beam.

A similar analysis of operation may be for an MS located in the coverage area of other beacons. If an MS is located in the area of coverage near the edge of a sector, such as in beacon A, the MACA list may also include an appropriate signal frequency from a signal in the adjacent sector Z for use in determining when an MS needs to be handed over to an adjacent sector.

As illustrated in FIG. 5, the invention may be used to reduce the number of control channels in a cell to one by adding an omnidirectional antenna to provide an umbrella control channel beam for control of all MSs in any of the sectors of the cell in a manner directly analogous to that described in connection with FIG. 4.

As is known by those skilled in the art, the digital control channel (DCCH) frequency signal in present day IS-136 compliant systems comprises one control channel and two traffic (voice) channels. These traffic channels (and any others assigned to the umbrella beam) may be used in both of the embodiments of FIGS. 4 and 5 to temporarily provide communication to MSs being handed off from neighboring cells until a determination may be made as to the strongest beacon frequency being received by the handed off MS. Once such a determination is made, the MS is assigned a channel appropriate to the antenna forming that beacon frequency signal. Mobiles are served by channels on the umbrella beam only until such time as they can be handed down to one of the narrow beams. This is because it is advantageous, from an RF interference point of view, to use a narrow beam to serve a call rather than the umbrella beam.

When the present invention is implemented in an IS-54 compliant system, the umbrella beam will comprise an analog control channel (ACCH) and a small number of voice channels. Thus the umbrella beam for an IS-54 system may be similar in usage to that of a DCCH frequency beam which includes two traffic channels. All origination messages and page responses from an MS will be handled by the voice channels in the umbrella beam in an IS-54 system, since there is no means of determining the best server beam for a mobile at call setup time. Once the call is set up on a channel on the umbrella beam, the mobile transmissions will be received by all of the narrow beam antennas as well as by one or more antennas in adjacent sectors when using the configuration of FIG. 4. The relative signal strengths of the signals as received by the various antennas of the BTS may be used to logically determine the appropriate antenna to be used to serve the MS and the call is then handed down.

Radio signal receivers made by some manufacturers for cellular equipment include inputs from various antennas. These multiple inputs are useful for receiving diversity signals as well as determining the location of an MS for handover of an MS from one sector of a cell to an adjacent sector. The chart of FIG. 6 illustrates one possible set of connections that may be made with respect to receivers operating in the X sector of FIG. 4.

As shown, a receiver that is used to receive traffic frequency signals of a given frequency from an MS in beam A receives signals from the main A beacon antenna at port 1. At port 2 it receives any component of the signal at the given frequency that might be picked up by a diversity antenna in the Z sector (Z(D)). Any components of signal at said given frequency as detected at a Y sector main antenna (a rear area of the A beacon antenna) are supplied to port 3. Given frequency signals detected by a diversity antenna for beacon A are supplied to port 4 while those signals detected by a main antenna used by beacon B are supplied to port 5. A further rear area input is provided at port 6 from a main antenna in sector Z.

For each of the radio receivers operating in conjunction with the A, B, C, and D beacon antenna, Port 2 comprises signals received from an antenna located to the left of the main antenna while port 5 comprises signals received from an antenna located to the right of the main antenna. The receiver operating to receive signals from the umbrella beam X antenna is connected somewhat differently in that ports 2, 3, 5, and 6 are connected to receive inputs from the main antennas from beacons A, B, C, and D respectively. Similar logic to that used to determine the location of an MS for handover purposes may be utilized to determine the location of an MS for initial frequency assignment purposes. In other words, while an MS is communicating with the BTS for origination purposes or in response to a page request, the relative signal strengths as received at the ports 2, 3, 5, and 6 may be compared to determine the location of the MS in question. If the signal transmitted from the MS is received at the highest amplitude at port 3, the MS is probably located within the area of beacon B and between the extremes of beacons A and C. Accordingly, the MS is assigned a traffic signal channel selected from a set of frequencies to be used in conjunction with the antenna transmitting beacon B. If, on the other hand, the signals received at ports 2 and 3 are substantially equal, the Ms is likely located in the overlapping area of beacons A and B. If past history as to the direction of movement of the MS is available, it may be used in determining the frequency assignment. Also, in such a case, an assignment frequency may be made on the basis of available capacity of antenna A for additional traffic relative antenna B.

Similar obvious considerations occur in applying the present invention to the configuration of FIG. 5 and further explanation is believed unnecessary.

The present invention comprises the use of an umbrella antenna for control such as signal assignment and handover in conjunction with a plurality of traffic frequency antennas each covering a unique portion of the area covered by the umbrella antenna whereby system capacity is increased while reducing signal channels devoted to control.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A cellular system comprising:
   a mobile switching center (MSC);
   a plurality of BTSs (base transceiver stations);
   a base station controller interfacing between said MSC, and said plurality of BTSs;
   a plurality of antennas, associated with at least one of said plurality of BTSs, transmitting differently directional but overlapping voice channel signal transmission beams wherein said overlapping beams form an area of cell coverage for communicating with mobile stations (MSs);

a plurality of antennas, associated with at least one of said plurality of BTSs, transmitting a plurality of beacon traffic signal beams each covering a different portion of an area of cell coverage for communication between the BTS and any MSs in that area;

an umbrella beam antenna, transmitting a control channel signal, for communicating with all MSs within said area of cell coverage to assign voice traffic channels to be used by MSs within said area of cell coverage;

maintaining a given power level on each of said plurality of beacon traffic signal beams, each of said plurality of beacon traffic signal beams being transmitted on a different carrier frequency;

determining the position of an MS relative to said plurality of beacon traffic signal beams based upon the relative strength of the received beacon traffic signal beams; and assigning a traffic channel to an MS in accordance with its position within said plurality of beacon traffic signal beams.

2. A wireless system comprising:

a BTS (base transceiver station) apparatus;

umbrella antenna means, associated with said BTS, for generating an umbrella control signal beam covering a given area relative to said BTS;

further antenna means, associated with said BTS, for generating a plurality of traffic signal beacons each of which covers a separate portion of said given area;

assignment means for assigning separate sets of traffic signal frequencies to be used by MSs (mobile station) within each of the separate portions of the given area as defined by each of the traffic signal beacons;

receiving means for receiving from an MS the relative strength of received traffic signal beacons;

logic means for determining the portion of said given area in which said MS is located on the basis of the relative strength of received traffic signal beacons; and control means for informing the MS, via said umbrella antenna means, of an assigned traffic channel frequency to be used by the MS in accordance with the determination of MS location within said given area.

3. A method of assigning traffic channel frequencies comprising the steps of:

generating an umbrella control signal beam covering a given area;

generating a plurality of traffic signal beacons each of which covers a separate portion of said given area;

assigning separate sets of traffic signal frequencies to be used by MSs (mobile station) within each of the separate portions of the given area as defined by each of the traffic signal beacons;

receiving, from said MSs, information on the relative strength of received traffic signal beacons;

determining, from said information on the relative strength of received traffic signal beacons, the portion of said given area in which a given MS is located; and informing the MS, via an umbrella control signal, of an assigned traffic channel frequency to be used by the MS in accordance with the determination of MS location within said given area.

4. A method of determining the position of an MS (mobile station) in a cell of a wireless communication system comprising the steps of:

generating a plurality of beacon traffic signal beams from directional antenna means, each of said beacon traffic signal beams covering a given portion of a cell of a cellular wireless system;

generating an umbrella control channel beacon covering all the portions of the cell covered by said plurality of traffic signal beacons;

establishing contact between an MS and a BTS (base transceiver station) via an antenna generating said umbrella control channel beacon;

receiving from said MS one or more items of data, wherein the items of data comprise one or more relative strengths of said plurality of beacon traffic signal beams; and determining the position of said MS within the coverage area of said plurality of beacon traffic signal beams from said one or more relative strengths of said received beacon traffic signal beams.

5. The method of claim 4 wherein the received signals used in making the determination of position are the beacon signals received by the MS and each of said beacon signals as transmitted are substantially equal in power.

6. The method of claim 4 wherein the received signals used in making the determination of position are the signals received from the MS by the antenna means generating the plurality of traffic signal beacons.

7. A method of communicating between a BTS (base transceiver station) of a wireless system and a plurality of MSs (mobile stations) comprising the steps of:

transmitting a plurality of beacon traffic signal beams each covering a different portion of an area of cell coverage for communication between the BTS and any MSs in that area;

transmitting an umbrella control signal beam covering said area of cell coverage of said plurality of beacon traffic signal beams;

maintaining a given power level on each of said plurality of beacon traffic beams, each of said plurality of traffic beams being a different carrier frequency;

determining the position of an MS relative to said plurality of beacon signals based upon the relative strength of received signals; and assigning a traffic channel to an MS in accordance with its position within said plurality of beacon signals.

8. The method of claim 7 wherein determining the position of an MS is based upon the relative strength of signals received at an MS as determined from a MACA (mobile assisted channel allocation) list.

9. The method of claim 7 wherein determining the position of an MS is based, at least in part, upon the relative strength of signals received from an MS by antennas used to form the beacon traffic beams.

10. A method of assigning a mobile station (MS) to one of a plurality traffic signal antennas used to cover an area of a wireless system comprising the steps of:

transmitting a plurality of beacon traffic signal beams, each covering a different portion of an area of cell coverage;

transmitting an umbrella control signal beam from an umbrella antenna that covers said area of cell coverage of said plurality of beacon traffic signal beams;

determining, based upon data received from an MS relative to signal strengths of the beacon traffic signals received at the MS, the position of the MS communicating with the system via the umbrella antenna; and assigning the MS a traffic channel based upon said determination.

* * * * *